2,977,340

PREPARATION OF POLYOXAMIDES WITH TRIOXIDES AND TRIHALIDES OF As, Sb AND Bi AS CATALYSTS

Stephen Desiderius Bruck, Wilmington, Del., assignor to E. I. du Pont de Nemours and Company, Wilmington, Del., a corporation of Delaware No Drawing. Filed Apr. 4, 1958, Ser. No. 726,309

10 Claims. (Cl. 260—78)

This invention relates to polyoxamides and to processes for preparing high molecular weight polyoxamides. In particular, it relates to the catalyzed condensation of oxalic esters with appropriate diamines to give fiber-forming polyoxamides.

Polyoxamides having fiber-forming properties may be prepared by the process described in U.S. Patent 2,071,251 from a diamine and oxalic acid or an oxalic ester, but these polyoxamides exhibit poor spinnability. Their spinnability can be improved, however, by condensing oxalic esters with monomethyl or dimethyl hexamethylenediamine. These polyoxamides obtained by solid phase polymerization with an acid catalyst and with or without an inert diluent show good spinnability and inherent viscosities up to about 1.0. The usefulness of said polyoxamides for textile and industrial yarns would be further increased considerably if a process were available yielding spinnable polyoxamides of higher molecular weight as evidenced by higher inherent viscosities.

Prior art solid phase polyoxamidations with an acid catalyst and with or without inert diluent have not provided polyoxamides having inherent viscosities greater than about 1.0, and melt polyoxamidations have not resulted in a spinnable product. German Patents No. I 69,841, and No. I 69,415, state that such polymers cannot be prepared successfully by melt polymerization, due to excessive degradation. U.S. Patent 2,558,031 advises against the use of temperatures above the melting point of the polymer during the preparation of the polymer.

An object of this invention is to provide a process for the preparation of spinnable high molecular weight polyoxamides with inherent viscosities above about 1.0.

Another object of this invention is to provide a process for the preparation of spinnable high molecular weight polyoxamides of inherent viscosities of up to about 1.6.

Still another object of this invention is to define catalysts and conditions for the preparation of spinnable high molecular weight polyoxamides by polymerization of oxalic esters with appropriate diamines.

In accordance with this invention, high molecular weight polyoxamides with inherent viscosities above about 1.0 can be obtained by solid phase or melt condensation of oxalic esters with appropriate diamines in the presence of certain compounds of the elements of group V of the periodic table of elements as catalysts.

The polyoxamides of this invention contain the following repeating unit:

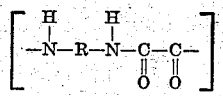

wherein R is a divalent hydrocarbon free from ethylenic unsaturation and containing at least four carbon atoms.

The suitable elements of group V of the periodic table of elements are arsenic, antimony, and bismuth.

The catalysts of this invention comprise the trioxides of arsenic, antimony and bismuth and the trihalides of the same elements having boiling points above about 215° C., arsenous trioxide and antimony trifluoride being particularly preferred. The chlorides, bromides, and iodides of these elements are also effective as catalysts.

Polymers of this invention are prepared by first preparing a prepolymer. This prepolymer is a partially polymerized reaction product of a diamine and an oxalic diester in the presence of a catalyst at room temperature and with agitation, the product having a molecular weight of between about 2000 and about 5000. A diluent such as toluene or butyl alcohol may be used as desired. All the reactants should be substantially pure and dry and the moisture content kept as low as possible throughout the prepolymerization and polymerization. Best results are obtained in the polymerization when the moisture content of the prepolymer is below 0.10%. The end of prepolymerization is indicated when the mixture becomes too viscous for stirring by hand.

The catalyst may be added either before or after prepolymerization. However, the catalyst should be added prior to polymerization proper. For convenience it is usually added prior to prepolymerization.

In a solid phase polymerization, optimum temperature is as close to the melting point of the prepolymer as possible, without actually melting the prepolymer. A preferred temperature range is between about 20 and about 2° C. below the melting point of the prepolymer, and most preferably, between about 10 and about 4° C. below the melting point. For the preparation of poly (2-methyl hexamethylene oxamide) for example, an optimum temperature is between 240–246° C. Optimum polymerization time varies with the specific catalyst employed and its concentration, and is in the range from about two to about three hours for the above polyoxamide at the preferred temperature ranges. Prolonged polymerization periods should be avoided, as producing degradation and discoloration of the polymer as well as a decrease in inherent viscosity of the polymer. Pressure is maintained below about 70 mm. and preferably below 5 mm. mercury. The concentration of catalyst required to obtain a high molecular weight product is in the range from about 0.03 to about 0.3%, based on the weight of the pre-polymer. The preferred range is from 0.1 to 0.2%. For batches of polymer up to about 15 grams, no agitation is required and a thin wall reaction tube is used that can be broken at the end of polymerization. For batches of polymer larger than about 15 grams, agitation is required to facilitate good heat transfer and can be effected by stirring the reaction mixture or by rotating the reaction vessel.

In melt polymerization, the prepolymer is completely melted as fast as possible at the lowest temperature that is practical, preferably between about 10 and about 30° C. above the melting point. Most preferably, this temperature range is between about 20 and about 25° C. above the melting point. For example, in the preparation of poly(2-methyl hexamethylene oxamide) the preferred temperature is between 270 and 275° C. The optimum polymerization time varies with the specific catalyst employed and its concentration is in the range of from about 0.5 to about 2.0 hours for the above polyoxamide at the preferred temperature range recited. Prolonged polymerization periods should be avoided, since they result in degradation and discoloration of the polymer as well as a decrease in inherent viscosity. Pressure is maintained below about 70 mm. and preferably below 5 mm. mercury. Concentration of catalyst required to obtain a high molecular weight product is generally in the range of about 0.01 to about 0.20% based on the weight of pre-polymer, but from 0.05 to 0.10% is preferred. Agitation requirements in melt polymerizations are the same as in the solid phase polymerization described above.

Inherent viscosities recited herein are determined by dissolving 0.25 gram of polymer in metacresol and diluting with meta-cresol to 50 cc., followed by determining the rate of flow of the solution through a viscosimeter. The inherent viscosity at 25° C. equals $$\frac{1}{C} \times \ln \frac{\text{flow time for solution}}{\text{flow time for m-cresol}}$$

wherein C represents the concentration of polymer in the solution and has the value of 0.500 gram per cubic centimeter.

EXAMPLE I

Purification of reactants

Di-n-butyl oxalate is stirred about 12 hours with calcium hydroxide to remove traces of the half-ester, filtered, dried with anhydrous calcium chloride, filtered again, distilled under a reduced pressure of 1 mm. mercury and stored under a nitrogen atmosphere.

2-methyl hexamethylenediamine is purified by distillation through a six foot Podbielniak high vacuum jacketed column under reduced pressure of 10 mm. mercury. The purified product has a neutralization equivalent in the range of from 65.1 to 65.4, as compared to the theoretical neutralization equivalent of 65.1.

Preparation of of prepolymer

Arsenous trioxide in an amount of 0.226 gram, 80.16 grams of 2-methyl hexamethylenediamine and about 50 ml. toluene are placed in a stainless steel beaker, and stirred for about 10 minutes. Di-n-butyl oxalate in an amount of 124.5 grams is then added rapidly together with 35 ml. toluene. Fast stirring is maintained with an air motor throughout the prepolymerization. Toluene is removed by vacuum at the end of the prepolymerization.

Preparation of high molecular weight polymer

About 15 grams of the freshly dried prepolymer is packed into a thin wall polymer tube (dimensions: 23 centimeters long, 2½ centimeter diameter, wall 1 millimeter thick), filling it about ⅓ full. The neck of the tube is bent to approximately 90° C. The tube is evacuated to about 1.0 millimeter mercury pressure and placed in an electrically heated salt bath at 245–246° C. Heating is continued for about 3 hours after which the tube is cooled and polymer removed. The polymer has an inherent viscosity of 1.32 and a white color.

This polyoxamide is then melted in a screw melter maintained at 285° C. and spun from a fine filament spinneret at a pressure of 4000 pounds per square inch. The resulting yarn wound up at a speed of 100 yards per minute is drawn at a draw ratio of 3.5 to provide a 44 denier yarn with 25% elongation at the break.

EXAMPLE II

Purification of reactants and preparation of prepolymer is conducted following the procedure of Example I, using 0.10 percent, by weight of the prepolymer, of arsenous trioxide. Freshly dried prepolymer thus prepared is packed into a thin walled polymer tube having the same shape and dimensions of that described in Example I, fi ling it about ⅓ full. The polymer tube is evacuated to about 1.0 millimeter mercury pressure and placed in an electrically heated salt bath at between 270 and 275° C. to melt and initiate polymerization. Heating is continued for one hour, after which the tube is cooled and polymer removed. The polymer, having an inherent viscosity of 1.54, is spun following the procedure of Example I to provide textile yarn of high quality.

EXAMPLE III

Purification of reactants and preparation of prepolymer is conducted following the procedure of Example I, using 0.1 percent by weight, based on the prepolymer, of antimony trifluoride as catalyst. Polymerization is conducted as in Example I, but the heating period is reduced from 3 to 2 hours. Polymer so produced has an inherent viscosity of 1.5 and a white color and is spun following the procedures of Example I to provide high quality industrial yarn.

EXAMPLE IV

Purification of reactants and preparation of prepolymer is conducted following the procedure of Example I, using 0.1 percent by weight, based on the prepolymer, of antimony trifluoride as catalyst. Polymerization is conducted as in Example II. The polymer so produced has an inherent viscosity of 1.5.

EXAMPLE V

Purification of reactants

Di-n-butyl oxalate is stirred about 12 hours with calcium hydroxide to remove traces of the half-ester, filtered, dried with anhydrous calcium ch'oride, filtered again, distilled under a reduced pressure of 1 mm. mercury and stored under a nitrogen atmosphere.

Octamethylenediamine is purified by distillation through a six foot Podbielniak high vacuum jacketed column under reduced pressure of 10 mm. mercury. The purified product has a neutralization equivalent in the range from 72.1 to 72.4 as compared to the theoretical neutralization equivalent of 72.1.

Preparation of prepolymer

Arsenous trioxide in an amuont of 0.244 gram, 88.6 grams of octamethylenediamine and about 50 ml. toluene are placed in a stainless steel beaker and stirred for about 10 minutes. Di-n-butyl oxalate in an amount of 124.5 grams is added rapidly, together with 35 ml. toluene. Fast stirring is maintained with an air motor throughout the prepolymerization. The toluene is removed by vacuum at the end of the prepolymerization reaction.

Preparation of high molecular weight polymer

About 15 grams of freshly dried prepolymer is packed into a thin wall polymer tube (dimensions: 23 centimeters long, 2½ centimeters diameter, wall 1 millimeter thick), filling it about ⅓ full. The neck of the polymer tube is bent to approximately 90°. The polymer tube is evacuated to about 1.0 millimeter mercury pressure and placed in an electrically heated salt bath at 267–270° C. (below the melting point of the prepolymer). Heating is continued for about 3 hours af'er which the tube is cooled and polymer removed. The resulting polymer has an inherent viscosity of 1.25 and a white color. This polyoxamide is then melt-spun following the procedure of Example I to provide high quality yarn.

EXAMPLE VI

Purification of reactants

Di-n-butyl oxalate is stirred about 12 hours with calcium hydroxide to remove traces of the half-ester, filtered, dried with anhydrous calcium chloride, filtered again, distilled under a reduced pressure of 1 mm. mercury and stored under a nitrogen atmosphere.

Decamethylenediamine is purified by distillation through a six foot Podbielniak high vacuum jacketed column under reduced pressure of 10 mm. mercury. The purified product has a neutralization equivalent in the range from 86.1 to 86.5 as compared to the theoretical neutralization equivalent of 86.1.

Preparation of prepolymer

Arsenous trioxide in an amount of 0.278 gram, 107.9 grams of decamethylenediamine, and about 50 ml. toluene are placed in a stainless steel beaker and stirred for about 10 minutes. Di-n-butyl oxalate in an amount of 124.5 grams is added rapidly together with 35 ml. toluene. Fast stirring is maintained with an air motor throughout the prepolymerization. Toluene is removed by vacuum at the end of the prepolymerization.

*Preparation of high molecular weight polymer*

About 15 grams of freshly dried prepolymer is packed into a thin wall polymer tube (dimensions: 23 centimeters long, 2½ centimeter diameter, wall 1 millimeter thick), filling it about ⅓ full. The neck of the polymer tube is bent to approximately 90°. The polymer tube is evacuated to about 1.0 millimeter mercury pressure and placed in an electrically heated salt bath at 245–246° C., which is below the melting point of the prepolymer. The heating is continued for about 3 hours, after which the tube is cooled and polymer removed. The resulting polymer has an inherent viscosity of 1.30 and a white color. This polyoxamide is then melt-spun and drawn following the procedure of Example I, but at 275° C., to provide high quality yarn.

While di-n-butyl oxalate has been shown in the examples as the preferred oxalic ester, any oxalic ester is suitable which has a derivative alcohol with a boiling point (at the reduced pressure of the polyoxamidation) more than about 10° C. below the melting point of the polymer. Such corresponding alcohols are sufficiently volatile to be removed from the reaction mix at the temperature used for the polyoxamidation. Suitable oxalic esters preferably include di-n-propyl oxalate, di-n-pentyl oxalate, di-n-hexyl oxalate, di-isobutyl oxalate, and di-pentyl-2-oxalate.

Furthermore, while 2-methyl hexamethylene diamine, octamethylene diamine and decamethylenediamine have been shown in the examples as the preferred diamines, other diamines are also suitable. For example, aromatic diamines having the general formula:

wherein $m$ and $n$ are 1 or greater, are suitable, as are alicyclic diamines having the general formula:

wherein $y$ and $x$ are 0 or greater.

These suitable diamines preferably include p-xylenediamine, O-xylenediamine, 1,4-diaminocyclohexane, and 1,4-diaminoethylcyclohexane.

The polyoxamides of this invention are useful in the production of fibers for use in industrial and textile yarns. Industrial yarns produced from these polyoxamides may be utilized, for example, as reinforcing material for elastomeric compositions. Textile yarns produced from these polyoxamides are quite suitable for the production of fabrics for such uses as in wearing apparel.

I claim:

1. The process comprising preparing a prepolymer having a molecular weight of between about 2,000 and about 5,000 by reacting an oxalic ester with a diamine selected from the group consisting of aliphatic diamines containing from 4 to 10 carbon atoms, p-xylene diamine, o-xylene diamine, 1,4-diaminocyclohexane, and 1,4-diaminoethylcyclohexane, and polymerizing said prepolymer to a polymer having an inherent viscosity, at 25° C. in a concentration of 0.500 gram per cubic centimeter of metacresol greater than about 1.0, in the presence of a catalyst selected from the group consisting of (1) trioxides of arsenic, antimony, and bismuth, and (2) trihalides of arsenic, antimony, and bismuth, each having a boiling point above about 215° C.

2. The process of claim 1 wherein the prepolymer is polymerized at a temperature less than the melting point of the prepolymer for a period of from about 2 to 3 hours at a pressure below about 70 mm. of mercury.

3. The process of claim 2 wherein the temperature is between about 20° and about 2° C. below the melting point of the prepolymer.

4. The process of claim 3 wherein the temperature is between about 10° and about 4° C. below the melting point of the prepolymer.

5. The process of claim 2 wherein the catalyst is present in an amount of from about 0.03 to about 0.3% based on the weight of the prepolymer.

6. The process of claim 5 wherein the catalyst consists of arsenous trioxide.

7. The process of claim 5 wherein the catalyst consists of antimony trifluoride.

8. The process comprising preparing a prepolymer having a molecular weight of between about 2,000 and about 5,000 by reacting an oxalic ester with a diamine selected from the group consisting of aliphatic diamines containing from 4 to 10 carbon atoms, p-xylene diamine, o-xylene diamine, 1,4-diaminocyclohexane, and 1,4-diaminoethylcyclohexane, melting said prepolymer and polymerizing the prepolymer to a polymer having an inherent viscosity, at 25° C. in a concentration of 0.500 gram per cubic centimeter of metacresol greater than about 1.0, in the presence of a catalyst selected from the group consisting of (1) trioxides of arsenic, antimony, and bismuth, and (2) trihalides of arsenic, antimony, and bismuth, each having a boiling point above about 215° C.

9. The process of claim 8 wherein the polymerization period is from about 0.5 to about 2.0 hours and at a pressure below about 70 mm. of mercury.

10. The process of claim 9 wherein the catalyst is present in an amount of from about 0.01 to about 0.20% based on the weight of the prepolymer.

References Cited in the file of this patent

UNITED STATES PATENTS

| | | |
|---|---|---|
| 2,130,948 | Carothers | Sept. 20, 1938 |
| 2,557,808 | Walker | June 19, 1951 |
| 2,558,031 | Allen et al. | June 26, 1951 |
| 2,647,885 | Billica | Aug. 4, 1953 |
| 2,704,282 | Stamatoff | Mar. 15, 1955 |

FOREIGN PATENTS

| | | |
|---|---|---|
| 781,289 | Great Britain | Aug. 14, 1957 |

UNITED STATES PATENT OFFICE

CERTIFICATION OF CORRECTION

Patent No. 2,977,340                  March 28, 1961

Stephen Desiderius Bruck

It is hereby certified that error appears in the above numbered patent requiring correction and that the said Letters Patent should read as corrected below.

Column 6, line 1, for "with" read -- and --.

Signed and sealed this 15th day of August 1961.

(SEAL)
Attest:

ERNEST W. SWIDER
Attesting Officer

DAVID L. LADD
Commissioner of Patents